United States Patent [19]

Conner

[11] Patent Number: 4,615,810
[45] Date of Patent: Oct. 7, 1986

[54] METHOD FOR TREATING HUMAN WASTE BY SOLIDIFICATION

[75] Inventor: Jesse R. Conner, Atlanta, Ga.

[73] Assignee: Chem-Technics, Inc., Atlanta, Ga.

[21] Appl. No.: 719,683

[22] Filed: Apr. 4, 1985

Related U.S. Application Data

[63] Continuation-in-part of Ser. No. 531,825, Sep. 13, 1983, abandoned.

[51] Int. Cl.⁴ .............................................. C02F 11/14
[52] U.S. Cl. ........................... 210/751; 210/764; 210/805; 210/916; 4/317; 4/320; 405/128
[58] Field of Search ............... 210/738, 751, 764, 805, 210/916, 765, 173, 174, 167, 143, 205, 206, 219, 712; 4/317, 318, 319, 320; 106/74, 76, 84; 405/128, 129

[56] References Cited

U.S. PATENT DOCUMENTS

| | | | |
|---|---|---|---|
| 1,303,358 | 5/1919 | Montgomery | 4/319 |
| 2,858,939 | 11/1958 | Corliss | 4/320 |
| 3,673,614 | 7/1972 | Claunch | 4/320 |
| 3,733,617 | 5/1973 | Bennett | 210/173 |
| 3,837,872 | 9/1974 | Conner | 106/81 |
| 3,841,102 | 10/1984 | Cinner | 210/751 |
| 3,844,946 | 10/1974 | Farrell | 4/320 |
| 3,893,656 | 7/1975 | Opacic | 210/751 |
| 3,934,275 | 1/1976 | Biston | 4/319 |
| 3,958,279 | 5/1976 | Bogusz | 4/319 |
| 3,988,258 | 10/1976 | Curtis | 210/751 |
| 4,012,320 | 3/1977 | Conner | 210/751 |
| 4,038,184 | 7/1977 | Svantesun | 210/751 |
| 4,115,876 | 9/1978 | Cole | 4/319 |
| 4,347,142 | 8/1982 | Albertassi | 210/173 |

FOREIGN PATENT DOCUMENTS 2543353  3/1977  Fed. Rep. of Germany ...... 210/173

*Primary Examiner*—Ernest G. Therkorn
*Attorney, Agent, or Firm*—Jones & Askew

[57] ABSTRACT

A method and apparatus for treating human waste by solidification. The method performed by the disclosed embodiment comprises receiving the waste in a toilet or receptacle, liquidizing the waste with a macerating pump, adding to the liquidized waste a solidification agent, mixing the liquidized waste and the solidification agent, and transferring the mixture of waste and solidification agent to a disposable container. The disposable container can be discarded through conventional solid waste handling procedures or discarded in sanitary landfills. The disclosed apparatus introduces a quantity of solidification chemicals into a liquidized waste provided from a holding tank of a recirculating toilet, and directs the mixture of waste and solidification agent into the disposable container.

13 Claims, 6 Drawing Figures

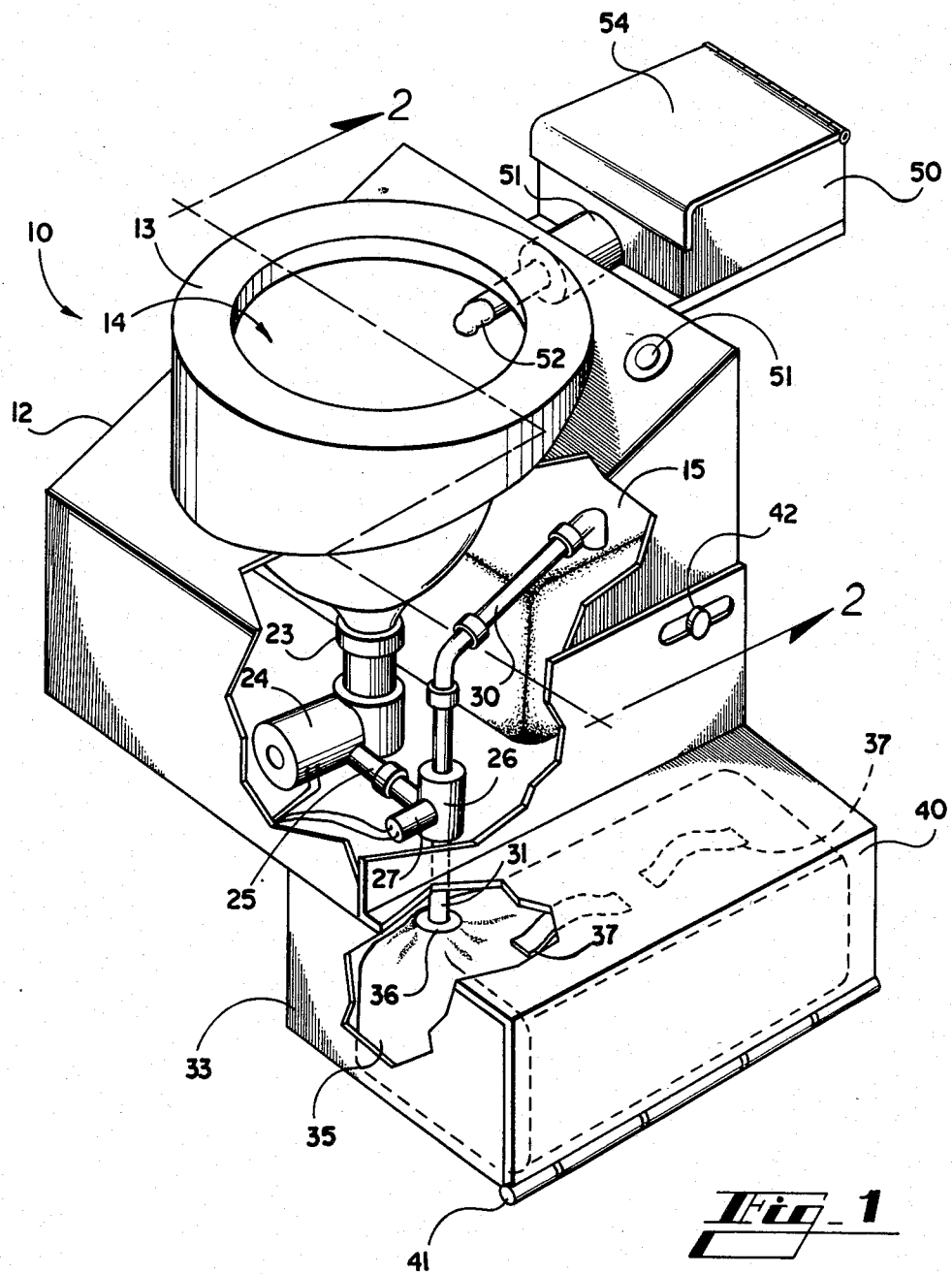
Fig_1

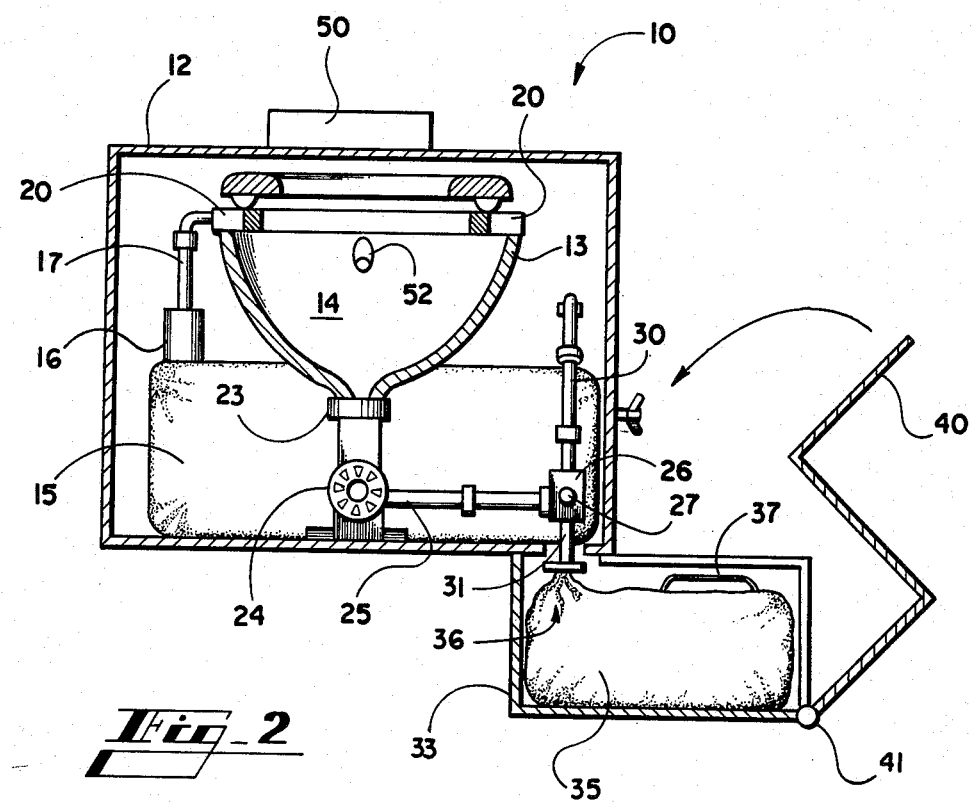
Fig_2
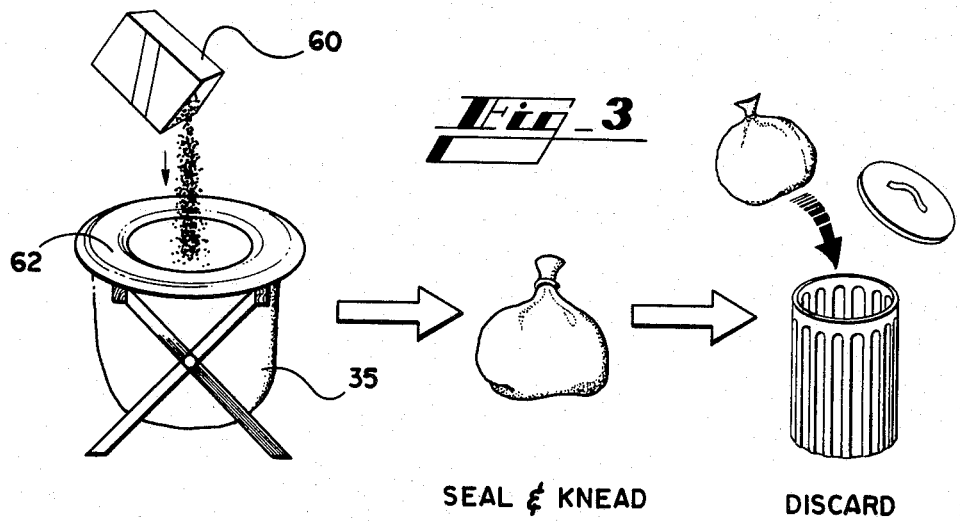
Fig_3
SEAL & KNEAD        DISCARD

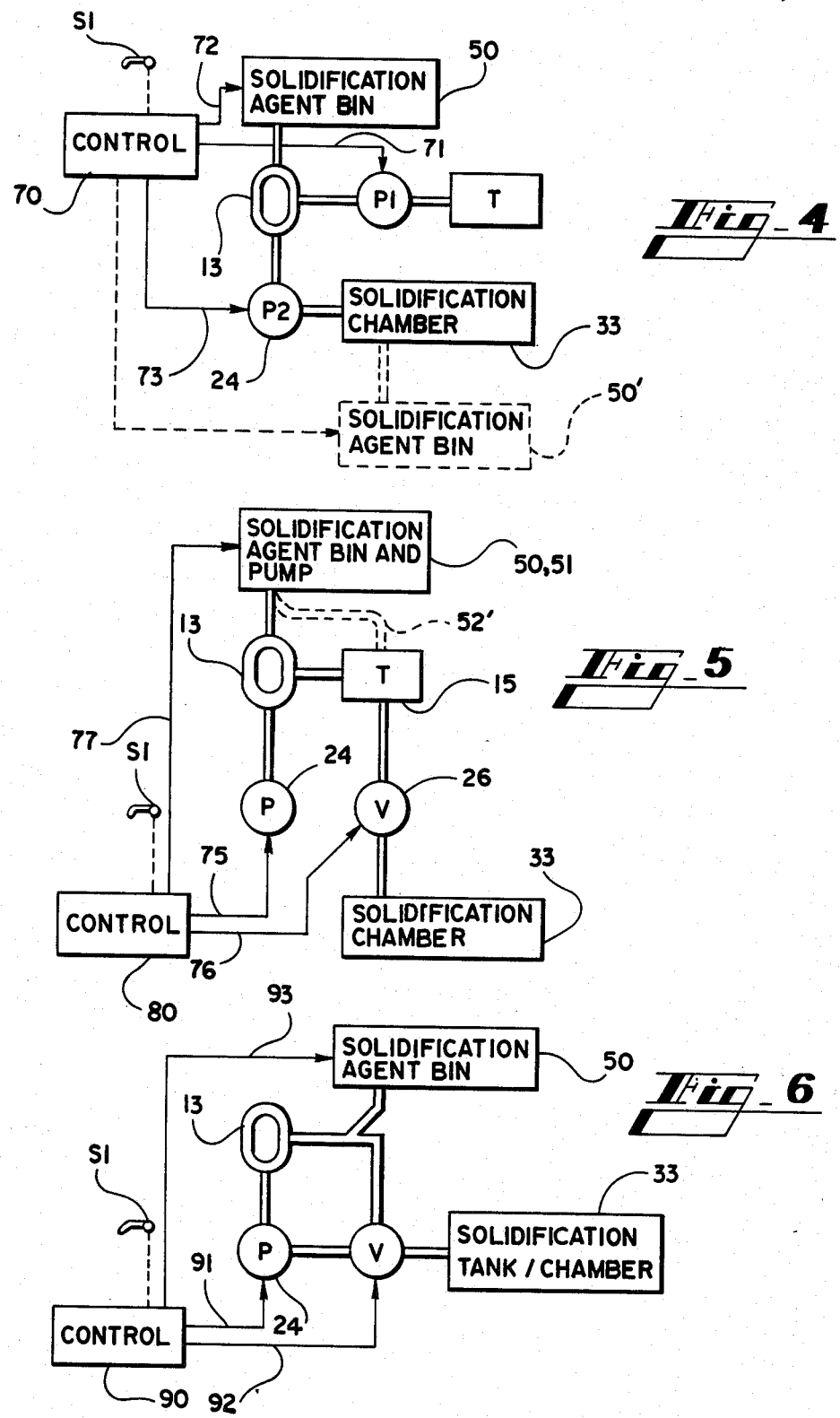

METHOD FOR TREATING HUMAN WASTE BY SOLIDIFICATION

CROSS REFERENCE TO RELATED CASES

This is a continuation-in-part of U.S. patent application Ser. No. 531,825 filed Sept. 13, 1983, now abandoned.

TECHNICAL FIELD

The present invention relates generally to waste treatment, and specifically relates to a method and apparatus for treating human waste to render it fit for ultimate disposal in a sedentary mass, by mixing the waste with a solidification agent and transferring the mixture into a disposable container.

BACKGROUND

There has long been a need for an improved system for handling human wastes in portable and certain fixed individual toilet systems, for example, toilet systems in boats, recreational vehicles, temporary portable toilets provided for construction and outdoor entertainment sites, camping facilities, and the like. Many of these present systems use disinfectant and/or deodorant chemicals to treat the waste to render it less offensive. These systems however still result in an accumulation of odorous and unpleasant sludge which must eventually be handled and transported, dumped into a sewage system, or otherwise finally disposed.

Chemical fixation and solidification processes for wastes have found recent favor for detoxifying human wastes and for producing solid waste having physical properties suitable for ultimate disposal in landfills, ocean dumping, and the like. The use of sanitary landfills is one of the major current methods for final disposal of sludge and incinerator ash resulting from the processing of sewage. Stabilized sludge containing no free water can be satisfactorily disposed in a sanitary landfill either along or in a mixture with municipal solid waste under current regulations. A sanitary landfill is managed so that wastes are systematically deposited and covered with earth to control environmental impacts within predefined limits. However, prior to placing sludge from the processing of human waste in a landfill, it is necessary that the waste be sufficiently dewatered or stabilized to minimize the quantity of free water present. Also, there are requirements that leachant and runoff from sanitary landfills must be minimized and when necessary collected and suitably treated to prevent pollution of ground and surface waters.

Certain waste solidification methods are known in the art. For example, U.S. Pat. No. 3,837,872 discloses a two-part cement-liquid silicate method for treating the liquid waste by adding an aqueous solution of an alkali metal silicate and a silicate setting agent, which converts the waste into a chemically and physically stable solid end product. This method is clearly effective in treating human waste, but suffers the disadvantage that the system requires the controlled introduction of the solidification chemicals in two parts at particular times in the treatment process.

In my co-pending application Ser. No. 510,152, filed June 3, 1983 now abandoned, which is incorporated herein by reference and made a part hereof, I disclose a method for treating aqueous liquid and semi-liquid waste by solidification by mixing a dry water-reactive solidification agent comprising cement, a dry water absorbent material, and a powdered alkali metal silicate to the waste to convert the admixture into a chemically and physically solid end product which contains virtually no free-standing water. With the advent of this system, which uses ingredients which are all dry powders and can be premixed, packaged, and stored, there is now available a solidification technology which can be satisfactorily employed in the context of a system for the treatment of human waste on site.

In order to employ such a solidification system for use in a portable or mobile toilet system, a number of requirements must be met. The mechanical components of the system must be compact and lightweight. The cost of the system should be roughly equivalent to existing commercial units presently used, such as in boats, airplanes, and recreational vehicles. Additionally, it is important that the solidified waste produced be easily disposable into normal solid waste processing channels. For example, it would be desirable if the waste could be placed in conventional garbage processing services provided by many municipalities and commercial services. Inasmuch as such garbage processing facilities currently handle items such as disposable diapers which are not disinfected prior to disposal, a disinfected solidified waste is safer and should be more acceptable than nontreated disposable diapers.

It is also important that the solidification system be simple and relatively foolproof. Preferably, the chemicals employed for solidification should be pre-packaged in an easy-to-dispense form, such as in a throw-away packet. Accordingly, the solidification chemicals should be relatively nonhazardous, and at worse no more hazardous than common household chemical products.

Finally, the solidified block of waste produced by the system should preferably be containerized to minimize the unpleasantries associated with handling or removing the waste. Moreover, the solid waste should be easily removable from the toilet system.

SUMMARY OF THE INVENTION

The present invention provides an improved method and apparatus for treating human waste by solidification which meets the foregoing requirements for a successful toilet system. Briefly described, the invention comprises a method for treating human waste in a system to render it fit for ultimate disposal in a sedentary mass, by adding to the waste a solidification agent, mixing the waste and the solidification agent to ensure thorough dispersal of the solidification chemicals, receiving the mixture of waste and solidification agent in a disposable container, followed by removing and discarding the disposable container and the solidified contents contained therein.

The present invention is suitable for use in boats, recreational vehicles, portable toilets provided for temporary use at construction sites and outdoor entertainment applications, as well as for camping and primitive cabins.

Advantageously, the end product of the system is a container which is easily handled and can be disposed through normal solid waste processing channels such as in a dumpster or garbage collection systems. In applications such as recreational vehicles, the messy and unpleasant step of connecting the waste holding tank to a pump to discharge the contents of the tank is eliminated and replaced with a less unpleasant step of removing a clean, sealed container from a chamber designed to house the disposable container. The mixture of waste and solidification agent can be discarded either prior to or after the mixture has set to a sedentary mass.

More particularly described, the method employed in the preferred embodiment, which is a recirculating-type toilet system, comprises the steps of receiving the waste in a receptacle, such as a recirculating toilet. The solidification agent is added to the waste in the receptacle and mixed to ensure thorough dispersal of the solidification chemicals. Prior to the setting thereof, the mixture of waste and solidification agent is transferred by a macerating pump to the disposable container. Then, the disposable container is removed and discarded.

In the disclosed embodiment, the wastes are first liquidized by a macerating pump in the recirculating toilet and transferred to the holding tank for recirculation. After a predetermined number of uses of the toilet, the solidification agent is added to the holding tank (or alternatively to the receptacle itself), and pumped with the macerating pump to mix the waste and solidification agent. Thereafter, a valve is actuated which directs the mixture of waste and solidification agent into the disposable container instead of returning the mixture to the holding tank.

In an alternative embodiment, a predetermined quantity of the solidification agent may be added to the waste after each use of the toilet, mixed with the waste, and transferred to the disposable container. When the disposable container becomes full, the solidified block of waste and solidification agent is removed and discarded.

Briefly described, the apparatus disclosed herein for treating human waste comprises a receptacle for receiving the waste from a person, waste liquidizing means for converting any solid waste in the receptacle to a substantially liquid form, means for introducing a predetermined quantity of the solidification agent into the liquidized waste, and a mixer for mixing the solidification agent and the liquid waste. The mixture is transferred by a pump to a removable and disposable container. The liquidizing means, mixer, and transferring means comprises a single macerating pump which is operative to liquidize the waste, to mix it with a solidification agent in a recirculating mode, and then to pump the mixture into the disposable container through a valve which directs the waste alternatively from the holding tank of the recirculating toilet to the disposable container which is contained within a solidification chamber.

Also provided in the preferred embodiment is a control circuit for controlling the operation of the macerating pump and the valve to cause the pump to mix the waste and solidification agent by recirculation. Thereafter, the control circuit actuates the valve so that the pump directs the mixture of waste and solidification agent into the disposable container. The control circuit in its preferred form is operative to run the macerating pump to liquidize the waste for a predetermined time to ensure thorough liquidation, as well as to run the pump for a predetermined time to thoroughly mix the solidification agent and the waste after introduction of the solidification agent into the waste.

Accordingly, it is an object of the present invention to provide an improved human waste treatment and disposal system for individual portable and recreational toilets.

It is a further object of the present invention to provide an improved system for handling human waste for use in portable and mobile toilet systems used in boats, recreational vehicles, camping, primitive cabins, and portable toilets for use at construction and outdoor entertainment sites.

It is a further object of the present invention to provide an improved method and apparatus for treating human waste by solidification.

It is a further object of the present invention to provide a method and apparatus for solidifying human waste by directing a mixture of waste and solidification agent into a disposable container which can be easily handled and discarded.

It is a further object of the present invention to provide a solidification system which is easily adaptable for use in connection with commercially available recirculating toilets.

It is a further object of the present invention to provide a human waste solidification system which employs a compact, lightweight, and cost-competitive mechanical toilet system.

It is a further object of the present invention to provide a human waste solidification system which produces a solid block of waste for easy disposal in normal solid waste processing channels.

It is a further object of the present invention to provide an improved method and apparatus for treating human waste by solidification which produces a solid block of waste cast inside a disposable container to minimize the unpleasantries associated with removing and handling the waste.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIG. 1 is a perspective view of a preferred embodiment of the present invention having a portion of the housing broken away to show the interior components.

FIG. 2 is a sectional view taken along the line 2—2 of the preferred embodiment shown in FIG. 1.

FIG. 3 is a diagram illustrating use of the solidification method in a portable camping-stool type toilet.

FIG. 4 is a schematic diagram of one preferred embodiment of the present invention.

FIG. 5 is a schematic diagram of a second preferred embodiment of the present invention.

FIG. 6 is a schematic diagram of a third preferred embodiment of the present invention.

DETAILED DESCRIPTION OF THE PREFERRED EMBODIMENT

Referring now to the drawings, in which like numerals indicate like elements throughout the several views, FIG. 1 shows a preferred embodiment of a human waste treatment and disposal system 10 constructed in accordance with the present invention. In general, the system disclosed in FIG. 1 is operative to perform the following method: (a) adding to the waste a solidification agent in a quantity sufficient to convert the waste and the solidification agent into a chemically and physically stable end product; (b) mixing the waste and the solidification agent to ensure thorough dispersal of the solidification chemicals throughout the waste; (c) receiving the mixture of waste and solidification agent in a disposable container; and (d) allowing removal and discard of the disposable container and the contents contained therein.

The system 10 basically comprises an outer housing 12 and a conventional toilet 13 including a bowl or receptacle 14. As will be understood, the bowl or receptacle 14 receives the waste from a person using the system 10.

It is specifically contemplated that certain commercially available electrically-operated, recirculating, self-contained, flushing toilets such as the Jet-O-Matic brand public sanitation systems manufactured by Monogram Industries, Inc., of Los Angeles, Calif., can be easily adapted for use in connection with the present invention. It will be understood that such commercially available recirculating toilet systems such as the system 10 in FIG. 1 include control circuits responsive to the actuation of a flush switch S1, which renders the system operative to recirculate the waste with a deodorizing and disinfecting chemical solution from a holding tank with a vigorous, forceful flushing action which cleans the bowl 14 upon each actuation. It will be further understood that each flushing cycle is automatically timed by the control circuit.

The recirculating toilet 13 includes a waste holding tank 15 which is contained within the housing 12. A pump 16 (FIG. 2) pumps fluid from the holding tank 15 through a pipe 17 and thence into the flushing ring 20, which directs the fluid downwardly over the surface of the bowl 14 to cleanse the bowl when the toilet is flushed.

The outlet of the bowl 14 is connected via a fitting 23 to the input of a macerating pump 24. In the preferred embodiment, a conventional macerating pump such as the Model 4003 Monopump manufactured by Monogram Industries, Inc., of Los Angeles, Calif., is employed. The macerating pump 24 performs the task of liquidizing the waste so that the waste will be in a substantially liquidized form, mixing the waste and the solidification agent, and pumping the mixture of solidification agent and liquidized waste into a disposable container.

The output of the macerating pump 24 is provided through an outlet 25 to a two-way valve 26 which is actuated by solenoid 27. The valve 26 is selectively actuable for directing waste from the macerating pump 24 either through a pipe 30 back into the holding tank 15 for recirculation, or alternatively through an outlet pipe 31 for disposal. The outlet pipe 31 is provided to a solidification chamber 33.

Contained within the solidification chamber is a disposable container 35 which includes a filling port 36. Preferably, the disposable container 35 comprises an impermeable membrane such as a polyethylene bag, which is connected to the filling port 36 in an empty, flattened configuration so that no air relief valve need be provided. Also, carrying handles 37 preferably are provided for ease in transporting the filled disposable container 35.

In the apparatus shown in FIG. 1, the disposable container is housed within the solidification chamber 33 disposed directly beneath the outlet pipe 31. A solidification chamber access cover 40 is provided for removing the disposable container, for connecting an empty container, and for maintenance access to the components of the recirculating toilet. As shown in FIG. 1, the solidification chamber 33 and the chamber access cover 40 can be constructed so as to form a step for a recreational vehicle. In such a configuration, the chamber access cover 40 is pivotably mounted on a hinge 41 so that it can be opened as shown in FIG. 2 to obtain access to the container and toilet components. A fastener 42 is provided for securing the chamber access cover 40 to the housing 12 of the toilet.

The solidification agent is introduced into the toilet 13 from a storage bin 50 which is mounted to the housing 12. Pumping means 51 such as an auger is provided for removing a predetermined quantity of solidification agent from the storage bin and for introducing the solidification agent into the bowl or receptacle 14 through an outlet port 52. A hinged cover 54 allows access to the storage bin for refilling the bin with solidification agent.

The preferred solidification agent for use in the present invention is a dry water-reactive solidification agent, such as disclosed in my co-pending applications, Ser. Nos. 510,152 and 532,615. The setting time of the solidification agent should be between one and ten minutes. This will give time for the addition, macerating and mixing actions to take place and for the mixture of solidification agent and waste material to be transferred into the disposal receptacle.

A typical formulation of the solidification agent suitable for use with the present invention are proportions of cement to water absorbent material ranging from between about 1:19 to about 47.5:1, cement to alkali metal silicate ranging from between about 2:1 to about 200:1, and alkali metal silicate to water absorbent ranging from between about 1:3,800 to about 3:1. The relative proportions of the components are varied to adjust to the desired friability or solidity of the end product, the rate of gel, the presence of inhibiting agents, and the proportion of solid waste product to water in the waste sludge or slurry. A typical formulation might be 1.5 pounds per gallow of a mixture of 65% Portland cement, 10% sodium silicate, and 20% clay, with a coloring agent (iron oxide) of about 1%, a surfactant of about 0.1% and lime (for acid neutralization) about 3.9%. Typical additive rates may vary from about 10% by weight to about 50% by weight, or from about 1 to about 5 pounds per gallow of waste.

The overall operative ranges of ingredients for a preferred formulation of the solidification agent including additives may be expected to be, by percent of weight of the formulation, Portland cement, 5–95%; powdered soluble alkali metal silicate 0.1–30%; clay, 2–80%; lime (for alkalinity adjustment), 0–40%; iron oxide or other colorant, 0–3%; surfactant, 0–0.1%; and other additives, 0–1.0%. The setting time may range from about 5 minutes to one or more days, depending upon the formulation, addition rate, waste composition, and ambient temperature and humidity. Typically, an initial setting time of 1 to 10 minutes is desirable. After initial setting, hardening continues for several days, with 75% of the hardness typically achieved within 10 to 20 days. The basic formulation of Portland cement, sodium silicate, and clay is generally considered nonhazardous and is easy to handle and use. Since the formulations tend to be alkaline, and since nearly all formulations contain very fine powders which can be irritating to mucous membranes it is generally advisable to utilize caution in handling the chemicals, for example, eye protection and dust masks should be used.

In determining the proper formulation, the question of volume increase associated with the end product must be considered. This factor can be important when the end product is to disposed in landfills or transported.

In order to counteract the effect of inhibitors, accelerators, or other waste constituents which affect the basic cement-silicate solidification process or the fixation of waste constituents in the solidified matrix, it may sometimes be desirable to include additives in the formulation of the solidification agent. Fixatives, waterproofing agents, and surfactants are additives which can assist the solidification of wastes containing certain types of solidification-affecting constituents. Clay, lime, and surfactants all act to eliminate the effects of inhibitors. Clay and lime, and to some extend cement, fix metals by absorption, ion-exchange and hydroxide formation, and gradually react with insoluble silicates to form the basis for the cement. The settling rate of solids in the waste may be controlled primarily by the addition of more clay, and to a lesser degree by the addition of lime.

A waterproofing agent is a compound which does not react chemically with the waste but prevents or retards leaching by sealing the waste particle within the solidified waste mass. Calcium stearate is a waterproofing agent useful in the present invention.

A surfactant is a compound which may be added to allow reaction to occur between a particular waste constituent and another constituent. Generally, surfactants enhance or accelerate the solidification reaction. Surfactants useful in the present invention include detergents, wetting agents, defoamers and the like. Although the mechanism by which surfactants operate is not clearly understood, it is thought that surfactants decrease interfacial tension between particles and thereby allow reaction between the waste particle and another constituent. Certain surfactants counteract the inhibiting effect of an aerobic condition in a biologically active waste sludge, and thereby allow the basic solidification agent to operate without requiring that uneconomical levels of the agent be added.

Surfactants perform a variety of functions including emulsification, gel stabilization, the wetting of hydrophobic waste constituents, and deactivation of certain inhibitors. Triton X-100, a sulfonated alkylphenol having a hydrophile-lipophile balance number of 13.5, manufactured by Rohm & Haas Company, Philadelphia, Pa. is a surfactant which may be used to counteract the inhibiting effect of anaerobic conditions in a biologically active waste sludge. The choice of surfactant depends upon the function required and the prevalent electrical surface charge on the suspended particulate or colloidal matter. The surfactants may usually be added in low amounts, usually only from between about 0.001 to about 1% of the total additive volume.

A mixing indicator or colorant such as iron oxide or the like may also be added. These substances, originally used as a colorant to indicate when mixing is complete, have been found to function in an unknown manner as activators in the setting reaction of the solidification agent disclosed herein. Other metal oxides may be used for the same purpose, but iron oxide is particularly suited for the method of the present invention due to its low cost, high coloring power and non-toxicity.

Commercial iron oxide grades found operative in the present invention include grade Mapico Red 347, manufactured by Cities Service Company, Atlanta, Ga., and grade RO 3097, manufactured by Pfizer Chemical Company, Atlanta, Ga. Finer particle sizes are preferable for a coloring agent, since particle size affects coloring power and effectiveness as an activator.

Lime, either anhydrous (quick) or hydrated, may be added to neutralize excess acidity in the waste. To a certain extent lime will act as a water absorbent, so the amount of clay may have to be adjusted accordingly. Many of the commercially available limes, including ground limestone (agricultural lime) are suitable for acid neutralization.

The basic method employed in the preferred embodiment is illustrated in simplified form in FIG. 3. The method illustrated in FIG. 3 is suitable for use in connection with primitive and portable toilet applications, as for example where the need exists for treating small quantities of waste on side such as at a camp site, followed by disposal of the waste by burial and the like. Solidification of the waste provides an acceptable method for treatment in heavily used camping areas where problems have been encountered with widespread and frequent latrine hole digging. Often, subsequent campers in the area are treated to the unpleasant experinece of stepping into a poorly covered latrine. Solidifying the waste ensures that after the latrine is covered and the waste solidified, the overlying ground can support the weight of persons walking without causing the person to sink into the waste.

The method described in FIG. 3 comprises adding a predetermined quantity of the selected solidification agent from a package 60 into the disposable container 35, which is adapted for use in connection with a portable camp toilet 62. Individual tear-open packages of solidification chemicals which are easily transportable can conveniently be employed for this application. The disposable container 35 is then sealed by tying off with a tie or clip, followed by shaking or kneading the container for a brief period to distribute the chemicals. After mixing the chemicals with the waste, the disposable container can be buried, or can be placed in a trash receptacle if available.

There are many disposal possibilities for the solidified waste which are not possible with untreated waste. For example, in boating, the solidified waste may be discarded overboard in deep water, or in areas where it is permitted for containerized and sinkable waste. Otherwise, the solidified waste can be easily stored for disposal in port into normal solid waste processing systems. In remote wilderness cabins and the like, the waste can be safely buried along with other solid trash. The solidified waste can even be placed into a garbage can and transported along with other solid waste to sanitary landfills, since the waste is totally encapsulated by the disposable container and presents no unpleasant appearance or odor.

Turning to FIGS. 4 through 6, there will now be described three systems for performing the preferred method of the present invention, for treating human waste by solidification in automatic toilet systems such as the one illustrated in FIG. 1. In particular, FIG. 4 schematically illustrates a toilet system which allows treatment of the human waste by solidification in a nonrecirculating toilet. In such a system, a tank T of fresh water or liquid treatment chemicals is used to flush the toilet 13. A control circuit 70 is responsive to a flush switch S1 actuated by the user when the waste is ready to be disposed, and provides a control signal on line 71 to a first pump P1 which provides a predetermined quantity of water or chemicals from the tank T to flush the toilet 13. The solidification agent is introduced into the waste from storage bin 50 by a control signal on line 72 from the control circuit 70.

In the embodiment shown in FIG. 4, a predetermined quantity of the solidification agent is introduced at the time the toilet is flushed by actuation of the pump P1. A macerating second pump P2 transfers the mixture of waste and solidification agent upon receipt of a signal on line 73 from the control circuit 70, and pumps the mixture into the disposable container within the solidification chamber 33. Alternatively, the solidification chemicals can be introduced directly into the disposable container by a storage bin 50' (shown in dotted relief) positioned adjacent the solidification chamber 33. Such an alternative embodiment might be desirable in situations wherein it is desired to mix the solidification agent and the waste directly within the solidification chamber 33, as opposed to mixing prior to introduction into the disposable container, and wherein means are provided for mixing the waste and solidification agent by agitation or the lijke ofthe disposable container.

FIG. 5 illustrates schematically the system shown in FIG. 1, which employs a recirculating toilet and holding tank. As in the system shown in FIG. 4, the actuation of a flush control switch S1 renders a control circuit 80 in FIG. 5 operative to run the pump 24, valve 26, and pump 51, in a predetermined sequence and for predetermined times, to effectuate flushing, liquidization, recirculation, addition of solidification chemicals, discharge to the disposable container, and the like.

Upon flushing, fluid from the holding tank 15 flushes the toilet 13, and the macerating pump 24 liquifies the waste upon receipt of a control signal on line 75 from the control circuit 80. A control signal on line 76 from the control circuit 80 actuates valve 26 to direct the liquified waste into the holding tank 15. A control signal on line 77 from the control circuit 80 controls the introduction of the solidification agent from the storage bin 50 directly into the receptacle or bowl of the toilet 13. In the configuration illustrated, after a predetermined number of flushes, the control circuit 80 automatically introduces the solidification chemicals into the waste as it is recirculated from the holding tank for a sufficiently long time to ensure thorough mixing of the chemicals. Then, the control signal on line 76 actuates the valve 26 to direct the mixture of waste and solidification agent into the disposable container in the solidification chamber 33.

Alternatively, the solidification chemicals can be introduced directly into the holding tank as shown by the dotted pathway 52'.

Still another suggested embodiment is illustrated schematically in FIG. 6. This system comprises a recirculating toilet without a holding tank. A control circuit 90 provides a control signal on line 91 to actuate the macerating pump 24 in response to actuation of the flush switch S1. A control signal on line 92 maintains the valve in a recirculating mode for a predetermined time so that the liquidized waste is recirculated through the toilet 13 for flushing. As the waste is recirculated to flush the toilet 13, a control signal on line 93 causes the introduction of a predetermined quantity of solidification agent from the storage bin 50 into the recirculating waste. After the liquidized waste and solidification agent have been thoroughly mixed, a control signal on line 92 then causes the valve to direct the mixture of waste and solidification agent into the disposable container within the solidification chamber 33. In such an embodiment, a quantity of solidification agent is added to the waste upon each flush, so that there is a gradual buildup of solidified waste and solidification agent in the disposable container, as opposed to a recirculation of the entire contents of a holding tank of waste, which would produce a single instance of solidification of waste and solidification agent.

It will now be appreciated that the disclosed apparatus comprises a receptacle or bowl for receiving the waste, a macerating pump for liquidizing the waste, means for introducing a quantity of solidification agent into the liquidized waste, mixing means for mixing the solidification agent and the liquidized waste, and means for transferring the mixture of solidification agent and liquidized waste into a disposable container.

It will be further appreciated that the disclosed apparatus performs the steps of receiving the waste, liquidizing the received waste, adding to the liquidized waste a solidification agent, mixing the liquidized waste and the solidification agent to ensure thorough dispersal of the solidification chemicals, transferring the mixture of waste and solidification agent from the receptacle to a disposable container, followed by removal and discarding of the disposable container.

In typical use of the preferred embodiment shown in FIGS. 1, 2 and 5, the recirculating toilet is first filled in a normal manner with water and disinfectant or deodorizing chemicals, and used through the normal number of cycles or uses. When the toilet is to be dumped, the solidification agent chemicals are added and the toilet run on a flush cycle until the chemicals are thoroughly dispersed. The valve 26 is then actuated to allow the mixture of waste and solidification agent to be pumped into the disposable container. As disclosed in the various alternative system embodiments, the recirculation process may be repeated with the addition of solidification chemicals on each use until the disposable container is full, or the method may be performed at one time with a single addition of a quantity of solidification chemicals sufficient to solidify the entire contents of the holding tank.

After the treated waste has hardened, or before hardening if desired, the disposable container is removed and tied off with a tie or clip provided therefor, and discarded.

It should be understood that adapting the disclosed embodiment for use with conventional recirculating toilets can easily be made completely automatic, such that the solidification cycle can occur automatically by counting the number of flush cycles by counting the actuations of switch S1, followed by automatically dispensing the solidification chemicals.

Finally, it will be understood that the preferred method and embodiments of the present invention have been disclosed by way of example and that other modifications may occur to those skilled in the art without departing from the scope and the spirit of the appended claims.

I claim:

1. A method of treating human wastes to render them fit for ultimate disposal in a sedentary mass, comprising the steps of:
    (a) receiving the wastes in a receptacle of a recirculating toilet;
    (b) removing and transferring the waste from the receptacle along a pathway from the receptacle to a storage chamber;
    (c) adding to the waste while in the pathway of solidification into a chemically and physically stable solid end product, said solidification agent having a setting time of a sufficient duration to allow removal of the mixture from the recirculating toilet;

(d) mixing the waste and the solidification agent using a macerating pump prior to the waste leaving the pathway to ensure thorough dispersal of the solidification agent throughout the waste;

(e) removing and transferring the mixture of waste and the solidification agent using a macerating pump from the pathway to a disposable container in the storage chamber; and (f) removing and discarding the disposable container and the contents thereof.

2. The method of claim 1, wherein the step of adding a solidification agent comprises adding a predetermined quantity of the solidification agent to the waste after each use of the receptacle by a person.

3. A method of treating human wastes to render them fit for ultimate disposal in a sedentary mass, comprising the steps of:

(a) receiving the wastes in a receptacle of a recirculating toilet;

(b) liquidizing the wastes;

(c) recirculating the liquidized waste through the recirculating toilet for a predetermined number of flushing cycles;

(d) removing and transferring the waste from the receptacle along a pathway toward a storage chamber;

(e) adding to the liquidized waste a solidification agent in a quantity sufficient to convert the waste and the solidification agent into a chemically and physically stable solid end product, said solidification agent having a setting time of a sufficient duration to allow removal of the mixture from the recirculating toilet;

(f) mixing the liquidized waste and the solidification agent with a macerating pump to ensure thorough dispersal of the solidification agent throughout the waste;

(g) removing and transferring the mixture of waste and the soliditication agent from the recirculating toilet using a macerating pump to a disposable container in the storage chamber; and (h) removing and discarding the disposable container.

4. The method of claim 3, further comprising the step of allowing the mixture of waste and solidification agent to set to a sedentary mass prior to removing and discarding the disposable container.

5. The method of claim 3, further comprising the step of allowing the mixture of waste and solidification agent to set to a sedentary mass after removing and discarding the disposable container.

6. The method of claim 3, further comprising the step of recirculating the liquidized waste with a deodorizing or disinfecting chemical.

7. The method of claim 3, further comprising the step of transferring the waste from the receptacle to a holding tank prior to the step of adding the solidification agent to the waste.

8. The method of claim 7, wherein the step of adding the solidification agent comprises adding the solidification agent to the holding tank.

9. The method of claim 3, wherein the step of adding a solidification agent comprises adding the solidification agent to the receptacle after each use by a person.

10. The method of claim 3, wherein the step of adding a solidification agent comprises adding the solidification agent to the disposable container.

11. The method of claim 3, wherein the step of liquidizing the waste comprises pumping the waste with a macerating pump.

12. The method of claim 3, wherein the step of adding a solidification agent comprises adding the solidification agent to the receptacle.

13. The method of claim 12, wherein the solidification agent is added after a predetermined number of uses of the receptacle.

* * * * *